(12) United States Patent
Azizou (10) Patent No.: US 9,719,437 B2
(45) Date of Patent: Aug. 1, 2017

(54) ENGINE CONTROL SYSTEMS AND METHODS FOR ACHIEVING A TORQUE VALUE

(71) Applicant: Cummins Inc., Columbus, IN (US)

(72) Inventor: Karim Abdoul Azizou, Richmond (CA)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 15/139,132

(22) Filed: Apr. 26, 2016

(65) Prior Publication Data
US 2016/0237924 A1   Aug. 18, 2016

Related U.S. Application Data

(63) Continuation of application No. PCT/US2014/054693, filed on Sep. 9, 2014.

(60) Provisional application No. 61/898,591, filed on Nov. 1, 2013.

(51) Int. Cl.
| | |
|---|---|
| F02D 41/14 | (2006.01) |
| F02D 41/00 | (2006.01) |
| F02D 11/10 | (2006.01) |
| F02D 37/02 | (2006.01) |

(52) U.S. Cl.
CPC ........ *F02D 41/0002* (2013.01); *F02D 11/105* (2013.01); *F02D 37/02* (2013.01); *F02D 41/0072* (2013.01); *F02D 41/1439* (2013.01); *F02D 41/1497* (2013.01); *F02D 2041/001* (2013.01); *F02D 2200/0406* (2013.01); *F02D 2200/0414* (2013.01); *F02D 2200/1002* (2013.01); *F02D 2250/18* (2013.01); *Y02T 10/42* (2013.01); *Y02T 10/47* (2013.01)

(58) Field of Classification Search
CPC ............ F02D 41/0002; F02D 41/1439; F02D 41/0072; F02D 41/1497; F02D 37/02; F02D 11/105; F02D 2200/0406; F02D 2200/1002; F02D 2041/001; F02D 2250/18; F02D 2200/0414; Y02T 10/42
See application file for complete search history.

(56) References Cited

U.S. PATENT DOCUMENTS

| | | | |
|---|---|---|---|
| 5,080,064 | A | 1/1992 | Buslepp et al. |
| 5,738,074 | A | 4/1998 | Nakamura et al. |
| 6,148,795 | A | 11/2000 | Gerhardt et al. |
| 6,209,519 | B1 | 4/2001 | Melchior et al. |
| 6,256,922 | B1 | 7/2001 | Jones et al. |
| 6,715,280 | B2 | 4/2004 | Lewis et al. |

(Continued)

FOREIGN PATENT DOCUMENTS

| | | |
|---|---|---|
| EP | 1712766 | 11/2010 |

OTHER PUBLICATIONS

International Search Report and Written Opinion, PCT/US2014/54693, Dec. 23, 2014Cummins Inc., 15 pgs.

*Primary Examiner* — Hieu T Vo
*Assistant Examiner* — Arnold Castro
(74) *Attorney, Agent, or Firm* — Taft Stettinius & Hollister LLP (57) ABSTRACT

A system comprising an engine and a controller configured to determine an air mass flow command to provide a target air mass flow value to the engine that is based on a base air mass flow value adjusted for engine operating conditions, deviations in the actual torque from a target torque, and corrected for flow conditions.

23 Claims, 6 Drawing Sheets

(56) References Cited

U.S. PATENT DOCUMENTS

| | | |
|---|---|---|
| 6,785,600 B2 | 8/2004 | Birk et al. |
| 6,883,493 B2 | 4/2005 | Matischok et al. |
| 7,163,007 B2 | 1/2007 | Sasaki et al. |
| 7,222,015 B2 | 5/2007 | Davis et al. |
| 9,115,664 B2 | 8/2015 | Stroh et al. |
| 9,228,510 B2 | 1/2016 | Stroh et al. |
| 2003/0196635 A1* | 10/2003 | Kataoka ............... F02B 47/08 123/299 |
| 2006/0064228 A1* | 3/2006 | Huang ............... F02D 41/0002 701/104 |
| 2009/0012665 A1 | 1/2009 | Brennan et al. |
| 2016/0084187 A1 | 3/2016 | Stroh et al. |

* cited by examiner

ENGINE CONTROL SYSTEMS AND METHODS FOR ACHIEVING A TORQUE VALUE

CROSS-REFERENCE TO RELATED APPLICATIONS

This application is a continuation of International Application No. PCT/US2014/054693 filed on Sep. 9, 2014, which claims the benefit of U.S. Provisional Patent Application Ser. No. 61/898,591, filed Nov. 1, 2013. The present application is further related to International Application No. PCT/US2013/056302 titled "ENGINE CONTROL SYSTEMS AND METHODS," filed on Aug. 22, 2013. The contents of each of these applications are hereby incorporated by reference in their entirety into this disclosure for all purposes.

TECHNICAL FIELD

The technical field generally relates to engine control systems, and more specifically, to engine control systems for controlling engine cylinder air mass flow to compensate for torque losses.

BACKGROUND

Spark-ignition (SI) engines can control torque differently than compression-ignition (CI) engines. Torque generated in a SI engine is primarily controlled through control of air because SI engines typically attempt to maintain a stoichiometric air-to-fuel ratio ("AFR"); whereas in CI engines, fuel can be controlled independent of air because the AFR for CI engines can vary significantly from the stoichiometric AFR over various engine operating conditions. As such, different engine systems typically employ different torque control techniques.

Regardless of the engine architecture, anticipated torque losses can result from a number of engine operating conditions that are consistent. For example, ignition timing can affect torque output, as can the use of exhaust gas recirculation ("EGR"). Yet, modern approaches to torque control differ depending on the particular engine architecture. Accordingly, there is not a uniform torque control scheme that can manage both SI and CI engine structures. Therefore, further technological developments are desirable in this area.

SUMMARY

One embodiment is a unique system comprising either a compression-ignition or spark-ignition engine and a controller configured to determine a charge flow or air mass flow command for operation of the engine. The air mass flow command provides a target air mass flow value to at least one cylinder of the engine. The target air mass flow value is derived from a base air mass flow value that is based on a fuel amount required to meet a net torque demand, and the base air mass flow value is adjusted for engine operating conditions, corrected for deviations in measured output torque from target torque, and/or corrected for EGR and VVA flow conditions to the at least one cylinder. Other embodiments include unique methods to determine an air mass flow command to achieve a target air mass flow value to one or more cylinders.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

In an embodiment according to the present disclosure, engine systems having different architectures can be controlled by a common torque control technique. That is, a common torque control technique can be applied to engines based on the masses of fuel and air supplied to the engine. Such engines include spark-ignition (SI) engines and compression-ignition (CI) engines, such as diesel engines. It should be appreciated that all combustion engines based on fuel and air operation are contemplated. As described in further detail herein, in an embodiment, a torque based interface can provide a transformation from a target torque to an appropriate cylinder air mass parameter for common use among different engine architectures, whereby the cylinder air mass parameter is used to control an air handling system of the engine to achieve the desired target torque.

In at least one embodiment of the disclosed control technique, the torque control is closed-loop. In such an embodiment, torque control in the operation of SI or CI engines is determined by measuring indicated torque with, for example, a combustion pressure sensor and comparing measured indicated torque with a target torque to determine a torque error that is used to provide feedback control adjustment of a feedforward target air mass flow to the cylinders of the engine, resulting in an air mass flow command that reduces the torque error. In a further embodiment, the torque control is open-loop. In such an embodiment, the feedforward target air mass flow into the cylinders is determined as a function of one or more operating condition corrections applied to a base air mass flow, which is determined as a function of the air-to-fuel ratio ("AFR") and a fuelling amount that satisfies the target torque when the engine is running at a stoichiometric air-to-fuel ratio or a base ignition timing (i.e., base spark timing). Where no feedback control of the target air mass flow is provided, the feedforward target air mass flow can be the air mass flow command.

Figure 1:
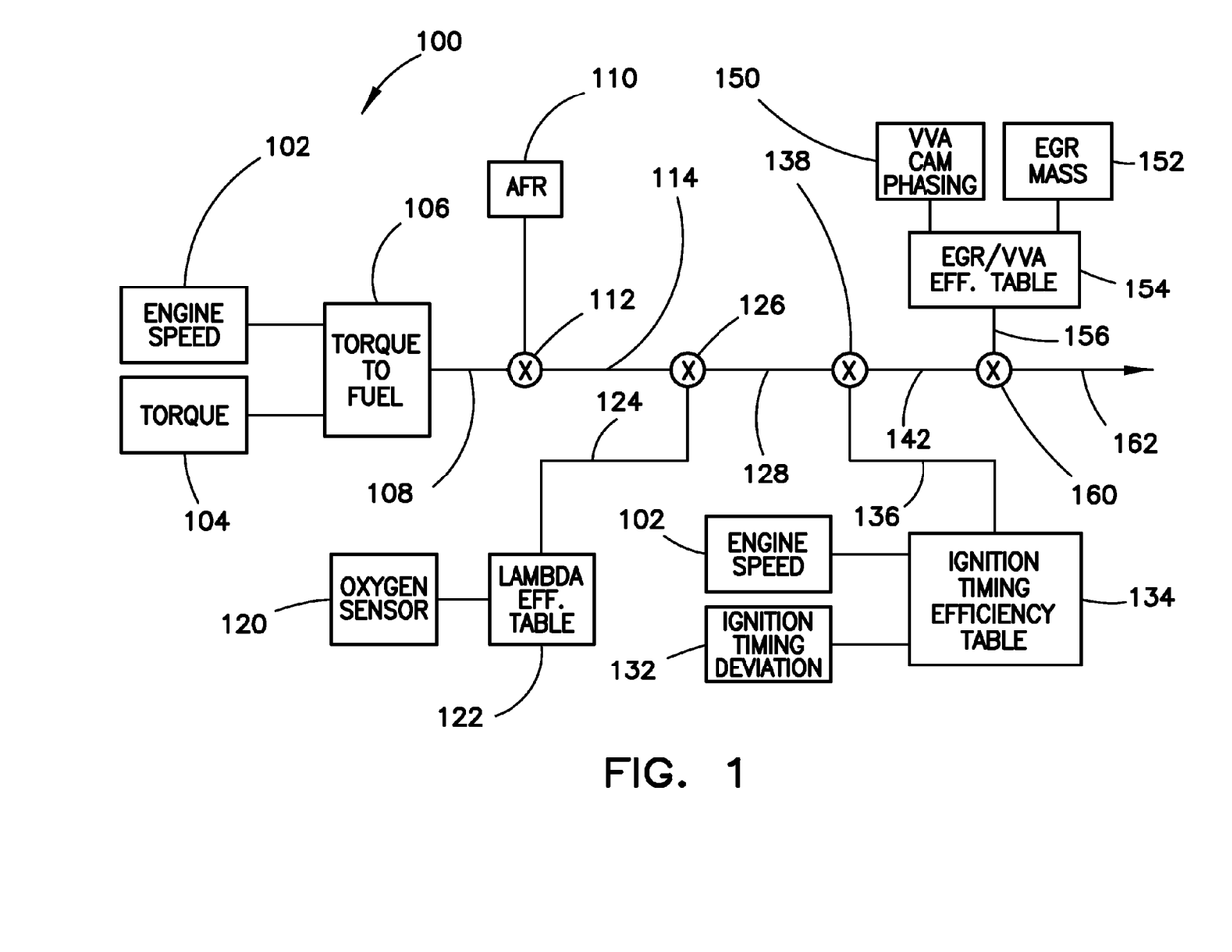
FIG. 1 is a block diagram of an example of an air mass flow adjustment of an air control apparatus according to an embodiment.

FIG. 1 is a block diagram of a control system 100 for providing adjustments of a base air mass flow value in response to engine operating conditions to determine a feedforward target air mass flow value to be provided by an open-loop air control system of an internal combustion engine according to an embodiment. In this embodiment, the air control system 100 includes a torque to fuel conversion table 106. The torque to fuel conversion table 106 can be configured to convert a target torque 104 and an engine speed 102 into a fuel amount 108. The target torque 104 includes pumping torque demand, friction torque demand, and net torque demand, where net torque demand is the torque demanded by an operator (e.g., via an accelerator pedal). Accordingly, the target torque 104 includes the operator demanded torque and the torque losses of engine operation. Accordingly, in certain embodiments, the target torque 104 may be an indicated torque to net torque demand. The fuel amount 108 represents the amount of fuel required to satisfy the net torque demand when the engine is running at stoichiometric air fuel ratio and target spark timing.

The fuel amount 108 can be multiplied with an air-to-fuel ratio 110 ("AFR 110") in multiplier 112 to generate a base air mass flow value 114. The AFR 110 is the current AFR of the engine. In SI engines, the AFR 110 will generally be stoichiometric having an air-fuel equivalence ratio (i.e., lambda value, λ) of about 1.0. In CI engines, which typically are operated under lean AFR conditions, the AFR 110 may be higher, having a nominal lambda value greater than 1.0. The base air mass flow value 114 can be, for example, an optimal or target air mass flow based on optimal or target operating conditions, such as a stoichiometric or nominal AFR or the base ignition timing that produces a desired operating condition. The base air mass flow value 114 may then be adjusted based on engine operating conditions to determine a final adjusted base air mass flow value 162. The engine operating condition adjustments that are made depend on whether the engine is a compression-ignition or spark-ignition engine.

A change in the AFR will impact brake torque and indicated torque. Therefore, the base air mass flow value 114 can be adjusted for the anticipated loss of torque due to a change in the AFR (i.e., lambda value), for example, becoming more lean or rich from target operating conditions. The base air mass flow value 114 can be adjusted by, for example, multiplying a lambda efficiency target 124 by the base air mass flow value 114 at multiplier 126 to yield a first adjusted base air mass flow value 128.

In the embodiment illustrated in FIG. 1, the lambda efficiency target 124 is selected from a lambda efficiency lookup table 122, where a lambda value input 120 is mapped against regression models and/or predetermined lambda efficiencies based on engine conditions in the lambda efficiency lookup table 122. The lambda value input 120 may be determined by an oxygen sensor (not shown) or any suitable means of determining the amount of oxygen introduced into the cylinders. It shall be appreciated that the lambda efficiency target 124 is not restricted to being selected from a lookup table and, thus, can be selected by any other storing method or device understood in the art. In at least one embodiment, the lambda efficiency target 124 may be calculated directly from regression models of engine operating conditions.

A deviation from a target ignition timing can further result in a loss of torque output. Therefore, the first adjusted base air mass flow value 128 can be further adjusted for the anticipated loss of torque output due to an ignition timing deviation 132 at the current engine speed 102 by multiplying an ignition timing efficiency target 136 by the first adjusted base air mass flow 128 at multiplier 138 to yield a second adjusted base air mass flow value 142.

In the embodiment illustrated in FIG. 1, the ignition timing efficiency target 136 is selected from an ignition timing efficiency lookup table 134, where the engine speed input 102 and the ignition timing deviation 132 are mapped against regression models and/or predetermined ignition timing efficiencies based on engine conditions in the ignition timing efficiency lookup table 134. It shall be appreciated that the ignition timing target 136 is not restricted to being selected from a lookup table, and can be selected by any other storing method or device understood in the art. In at least one embodiment, the ignition timing target 136 may be calculated directly from regression models of engine operating conditions.

In embodiments that employ a means of exhaust gas recirculation (EGR), the intake pressure must be increased to produce the same torque with the current air mass flow and fuel because EGR dilutes the air mass flow into the cylinders. Moreover, in embodiments including a SI engine equipped with variable valve actuation (VVA) actuators, the in-cylinder air mass flow also depends on the lift profile of the intake and exhaust valves produced by the VVA actuators, which affects the air mass flow into the cylinders, thereby impacting the torque output of the engine. To compensate for these effects, the second adjusted base air mass flow value 142 may be multiplied by an EGR/VVA efficiency target 156 at multiplier 160 to yield a final adjusted base air mass flow value 162 to be provided to the cylinders by controlling the air handling system of the engine in response to an air mass flow command, where the final adjusted base air mass flow value 162 is an air flow amount to the cylinders adjusted for engine operating conditions, feedback control of torque conditions, and/or adjusted for EGR flow and VVA disturbance. The control system 100 can be used in both CI and SI engine architectures for engine operation.

In the embodiment illustrated in FIG. 1, the EGR/VVA efficiency target 156 may be selected from an EGR/VVA efficiency table 154, where an EGR mass flow input 152 and a VVA cam phasing input 150 are mapped against regression models and/or predetermined EGR and VVA efficiencies based on engine conditions in the EGR/VVA efficiency table 154. The EGR mass flow input 152 may be determined by any suitable means including, but not limited to, a mass flow meter in communication with the EGR mass flow or a measured pressure differential between the intake and exhaust systems. It shall be appreciated that the EGR/VVA target 156 is not restricted to being selected from a lookup table, and can be selected by any other storing method understood in the art. In at least one embodiment, the EGR/VVA target 156 may be calculated directly from regression models of engine operating conditions.

Figure 2:
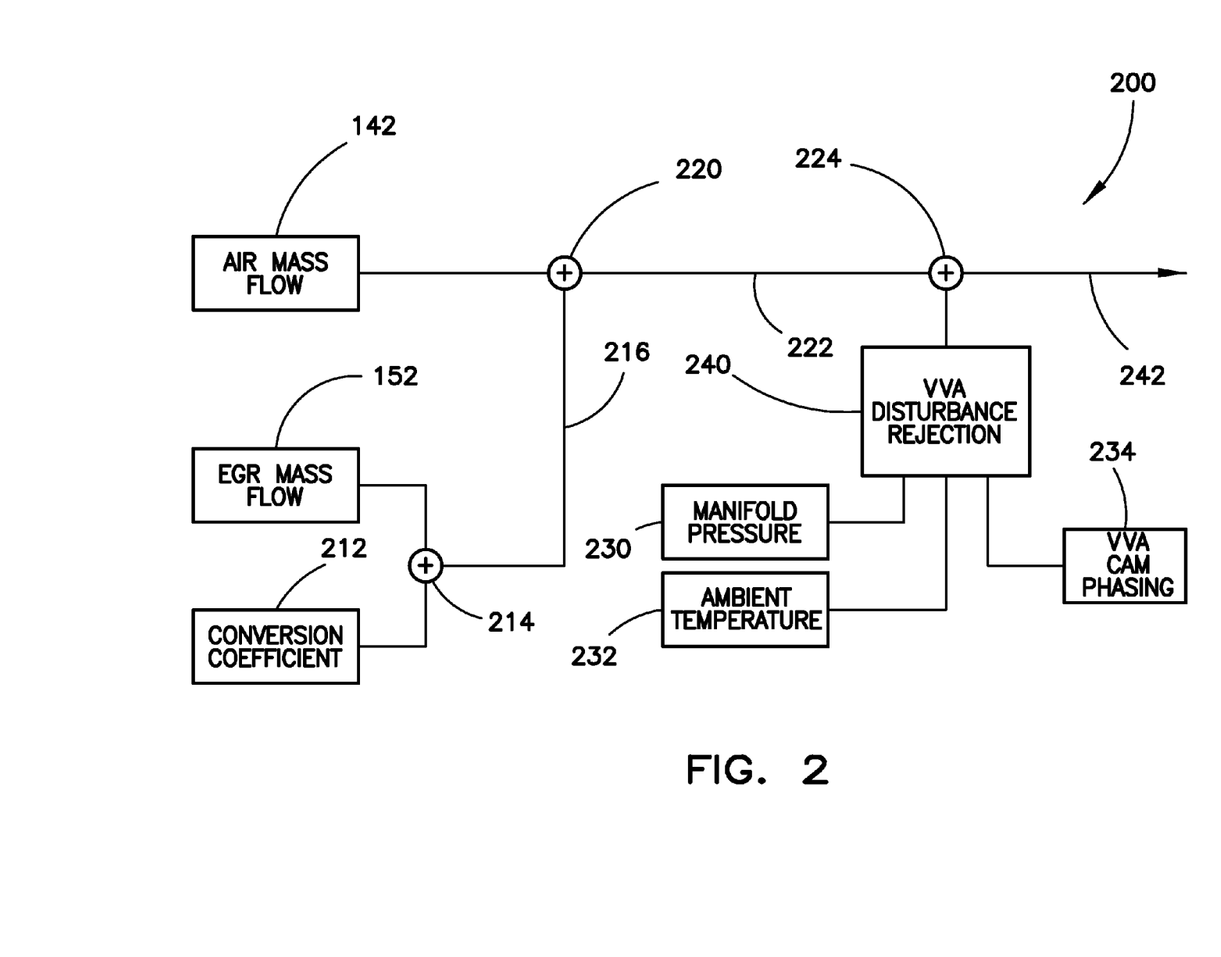
FIG. 2 is a block diagram of an example of an air mass flow correction of an air control apparatus according to an embodiment.

Alternatively, in at least one embodiment according to the present disclosure, the effects of EGR and/or VVA actuation on the second adjusted base air mass flow value 142 may be addressed by applying an EGR conversion coefficient 212 and a VVA disturbance rejection 240 as shown in FIG. 2. FIG. 2 illustrates a block diagram of an alternative control technique 200 for adjusting the second adjusted base air mass flow value 142 for flow conditions of the engine. As shown in FIG. 2, the second adjusted base air mass flow value 142 may be adjusted for the amount of EGR flow by multiplying the EGR mass flow input 152 by a predetermined conversion coefficient 212 at multiplier 214, resulting in a converted EGR mass flow 216. The second adjusted base air mass flow value 142 is summed with the converted EGR mass 216 at adder 220, resulting in an EGR corrected air mass flow value 222.

In embodiments including a SI engine equipped with variable valve actuation (VVA) actuators, the EGR corrected air mass flow value 222 may be further adjusted by a VVA disturbance rejection 240. VVA disturbance rejection 240 may be based on an intake manifold pressure (MAP) 230, an ambient temperature 232, and a VVA cam phasing 234. VVA disturbance rejection 240 may be used to adjust the air mass flow value 222 at adder 224 to yield a final adjusted air mass flow value 242 to be provided to the cylinders by controlling the air handling system in response to an air mass flow command, where the final adjusted air mass flow value 242 is an air flow amount to the cylinders adjusted for engine operating conditions, feedback control of torque conditions, and/or adjusted for EGR flow and VVA disturbance. Accordingly, the final adjusted air mass flow value 242 corresponds to the final adjusted base air mass flow value 162 (shown in FIG. 1) by a different control technique, the control technique 200. The control technique 200 can be used in both CI and SI engine architectures for engine operation.

Referring to FIG. 1, it should be appreciated that any subset or combination of the air mass flow adjustments described herein can be used in any order to adjust the base air mass flow value 114 to determine the final adjusted base air mass flow value 162. Accordingly, in certain embodiments, the base air mass flow value 114 may be adjusted using the ignition timing efficiency lookup table 134 prior to applying the lambda efficiency lookup table 122.

Figure 3:
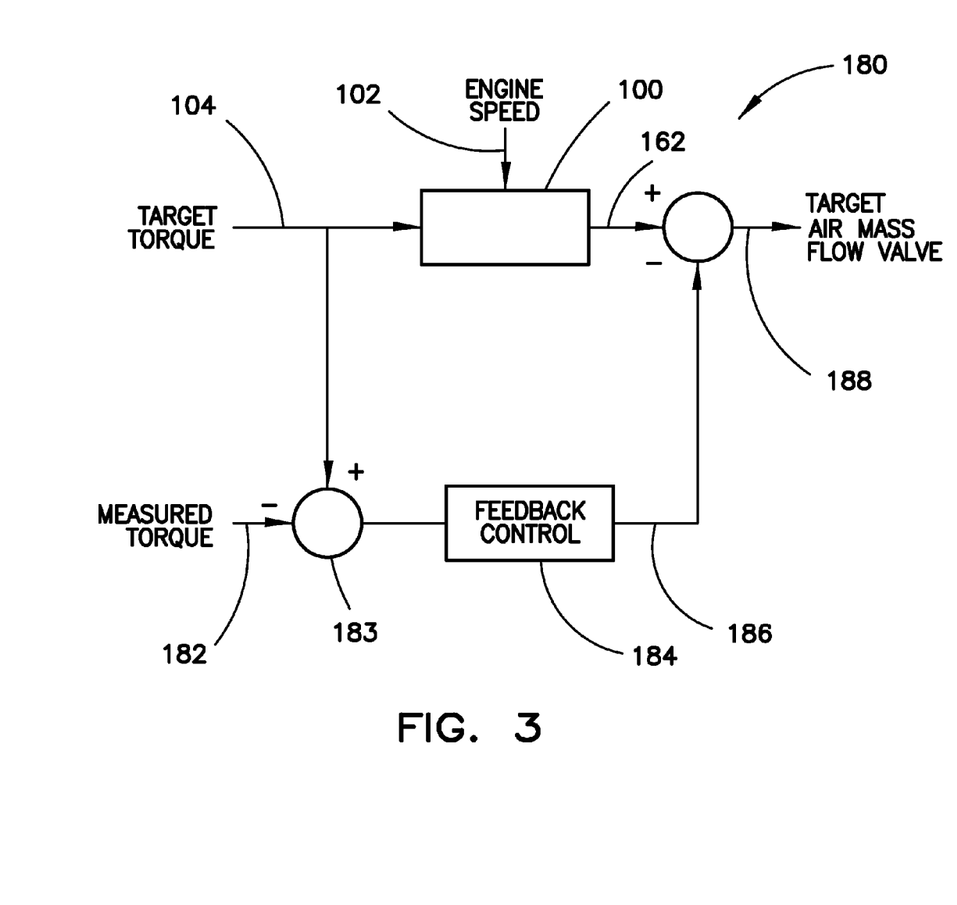
FIG. 3 is a block diagram of an example of a feedback control adjustment of an air mass flow value based on a deviation of a measured torque from a target torque according to an embodiment.

In at least one embodiment according to the present disclosure, the control system 100 may be used within a closed-loop control scheme to adjust an air mass flow command to reduce a torque error between a measured indicated torque and a target torque. FIG. 3 is a block diagram of a closed-loop control system 180 for providing adjustments of the final adjusted base air mass flow value 162, described in relation to the control system 100, in response to engine operating conditions to determine a feedforward target air mass flow value. As shown FIG. 3, in the control system 180, the target torque 104 and engine speed 102 are provided to the control system 100 to determine the final adjusted base air mass flow value 162 as described herein. In addition, a measured torque 182 is determined and compared to the target torque 104 at the comparator 183. The difference between the target torque 104 and the measured torque 182 is provided to a feedback control module 184. The feedback control module 184 outputs a feedback control adjustment 186 that is applied to the final adjusted base air mass flow value 162 from the control system 100 to yield a target air mass flow value 188.

The feedback control 182 can be a proportional-integral-derivative (PID) controller, a proportional-integral (PI) controller, or any other type of control loop feedback mechanism. In certain embodiments, the comparator 183 receives the measured torque 182 as a real torque value input. The real torque value, $T_{real}$, can be calculated according to the equation:

$$T_{real} = \frac{100 * V_d * imep}{2 * \pi * N_{cyl}} \quad \text{Equation (1)}$$

In Equation (1), $V_d$ is the volume of displaced air, $N_{cyl}$ is the number of cylinders in the engine, and imep is the indicated mean effective pressure measured using a combustion pressure sensor in communication with the cylinder or other suitable means.

Figure 4:
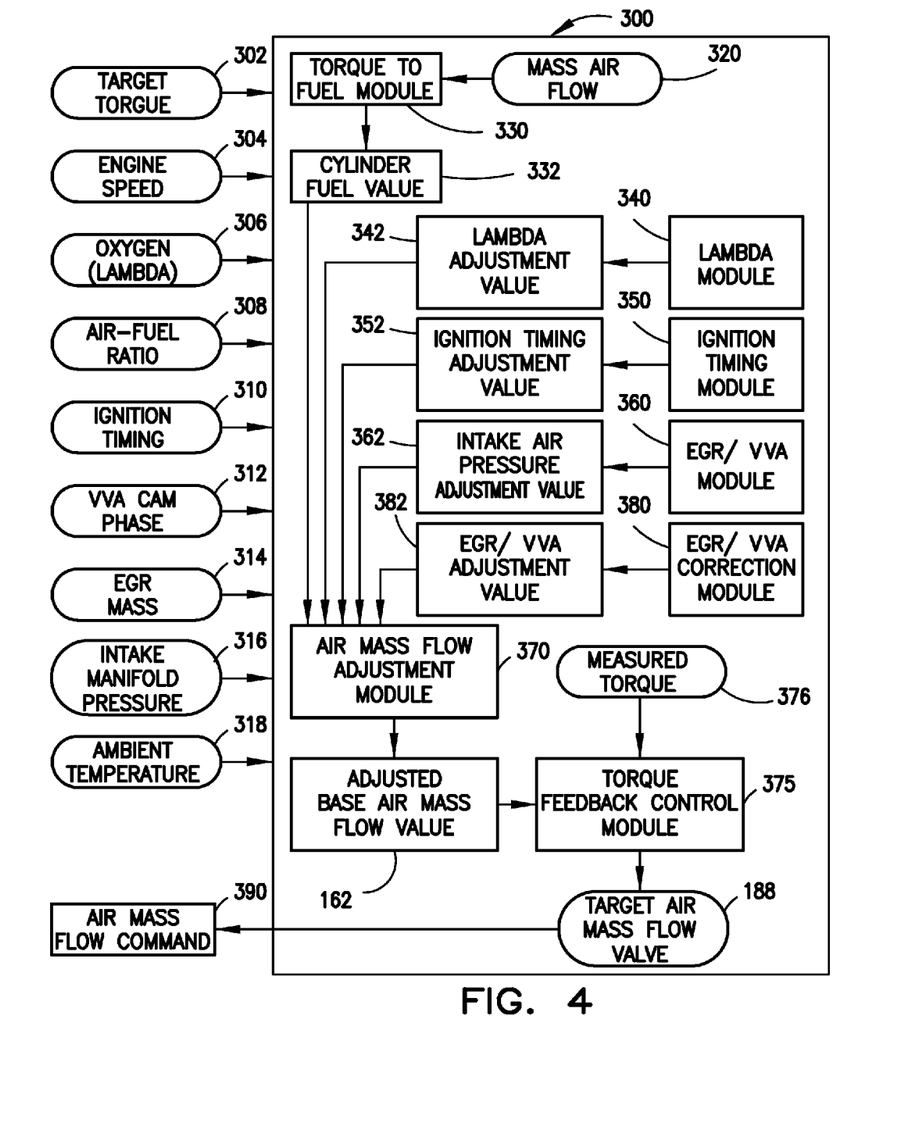
FIG. 4 is a diagram illustrating an exemplary controller apparatus for controlling engine cylinder air mass.

FIG. 4 illustrates a controller 300 structured to perform certain operations to determine a final adjusted base air mass flow value based on adjustment of the base air mass flow value for engine operating conditions, including engine speed and target torque, feedback control, and flow conditions to the cylinders. The controller 300 may be structured, depending on the embodiment, to determine the final adjusted base air mass flow value 162, the final adjusted air mass flow value 242, and/or the target air mass flow value 188, and further structured to provide an air mass flow command to an air handling system of the engine. In certain embodiments, the controller 300 forms a portion of a processing subsystem including one or more computing devices having memory, processing, and communication hardware. The controller may be a single device or a distributed device, and the functions of the controller may be performed by hardware or software.

In certain embodiments, the controller includes one or more modules structured to functionally execute the operations of the controller. In certain embodiments, the controller includes a torque to fuel module 330, a lambda efficiency module 340, an ignition timing module 350, an EGR/VVA module 360, an air flow mass adjustment module 370, a torque feedback control module 375, and an EGR flow and VVA disturbance correction module 380. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section above referencing FIGS. 1-3.

One exemplary embodiment of controller 300 is shown in FIG. 4. In certain embodiments, the controller 300 receives a target torque input 302, an engine speed input 304, an oxygen sensor lambda input 306, an AFR input 308, an ignition timing input 310, a VVA cam phasing input 312, an EGR mass input 314, an intake manifold pressure ("MAP") input 316, and an ambient temperature input 318.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or PW signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The torque to fuel module 330 receives and interprets the target torque input 302 and the engine speed input 304. In an exemplary embodiment, the torque to fuel module further interprets a mass air flow input 320. The torque to fuel module 330 provides a cylinder fuel value 332 to the air mass flow adjustment module 370. The cylinder fuel value 332 is determined by the fuel required to meet the net torque based on a base air mass flow determined at, for example, optimal conditions. The optimal conditions can include, for example, the engine running at stoichiometric AFR and/or at a target ignition timing that produces desired operating conditions.

The lambda module 340 receives and interprets the oxygen sensor lambda input 306. The lambda module 340 provides a lambda adjustment value 342 to the air mass flow adjustment module 370. In an exemplary embodiment, the lambda adjustment value 342 is a cylinder air mass flow adjustment determined by calculating how much to adjust the base air mass flow in response to changes in the AFR. Changes in the AFR may result in torque loss resulting from a change in the lambda value, for example, when the AFR changes from lean to rich, or from rich to lean.

The ignition timing module 350 receives and interprets the engine speed input 304 and the ignition timing input 310. The ignition timing module 350 provides an ignition timing adjustment value 352 to the air mass flow adjustment module 370. In an exemplary embodiment, the ignition timing adjustment value 352 is a cylinder air mass flow adjustment determined by calculating an ignition timing deviation based on the difference between the ignition timing input and a target ignition timing. The ignition timing adjustment value 352 compensates for an anticipated loss of torque resulting from the ignition timing deviation.

The EGR/VVA module 360 receives and interprets the EGR mass input 314 and the VVA cam phasing input 312. The EGR/VVA module 360 provides an intake air pressure adjustment value 362 to the air mass flow adjustment module 370. When the EGR dilutes the air, the intake pressure has to be increased to achieve the same target torque with the base air mass flow value and fuelling amount. In an exemplary embodiment, the intake air pressure adjustment value 362 is a cylinder air mass flow adjustment to compensate for EGR diluting the air. The intake air pressure adjustment value 362 can provide a further adjustment based on the VVA actuators. For example, in embodiments including SI engines equipped with VVA actuators, the in-cylinder air mass flow at least partially depends on the VVA actuators, which control the amount of fresh air in the cylinder, thereby affecting engine torque output.

In at least one embodiment, the controller may include an EGR/VVA correction module 380. The EGR/VVA correction module 380 receives and interprets the EGR mass flow input 314, the ambient temperature input 318, the intake manifold pressure 316, and the VVA cam phasing input 312. The EGR/VVA correction module 380 provides an EGR/VVA adjustment value 382 to the air mass flow adjustment module 370. In certain embodiments, the EGR/VVA correction module 380 may be used in place of the EGR/VVA module 360, and the air mass flow adjustment module 370 may use the EGR/VVA adjustment value 382 instead of the intake air pressure adjustment value 362 to determine the adjusted base air mass flow value 162.

In an exemplary embodiment, the air mass flow adjustment module 370 receives and interprets the cylinder fuel value 332, the lambda adjustment value 342, the ignition timing adjustment value 352, and the intake air pressure adjustment value 362 or the EGR/VVA adjustment value 382. The adjusted base air mass flow value 162 may be a function of the cylinder fuel value 332, the lambda adjustment value 342, the ignition timing adjustment value 352, and the intake air pressure adjustment value 362 or the EGR/VVA adjustment value 382 to adjust the base air mass flow value 114 in response to engine operating conditions In an exemplary embodiment, the cylinder fuel value 332 is multiplied by the AFR input 308, resulting in the base air mass flow value 114. The base air mass flow value 114 is further multiplied by any combination of any or all of the lambda adjustment value 342, the ignition timing adjustment value 352, and the intake air pressure adjustment value 362 or the EGR/VVA adjustment value 382, resulting in the adjusted base air mass flow value 162.

In certain embodiments, the air mass flow adjustment module 370 provides an adjusted base air mass flow value 162 to the feedback control module 375. The feedback control module 375 receives or determines a measured torque 376 to determine corrections to be applied to the adjusted base air mass flow value 162 to reduce the torque error. Accordingly, the feedback control module 375 compares the measured torque 376 with the target torque 302 to determine a feedback control correction, which is applied to the final adjusted base air mass flow value 162 to yield the target air mass flow value 188.

Depending on the specific embodiment, the controller 300 outputs an air mass flow command 390 to control various actuators to provide an air flow to the cylinders that satisfies the final adjusted air mass flow value 162 or the target air mass flow value 188. In certain embodiments, one or more cylinder air mass command(s) 390 are provided to the engine's air handling actuators to obtain the final adjusted air mass flow value 162 or the target air mass flow value 188 and to achieve the desired torque output.

Figure 5:
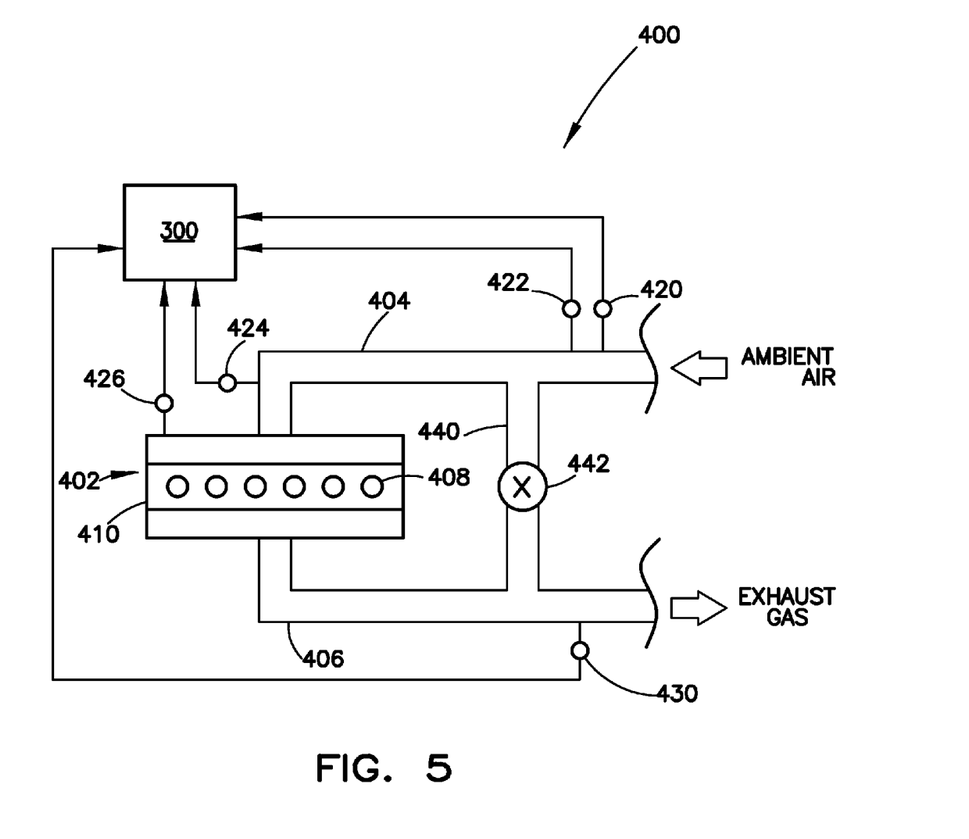
FIG. 5 is a schematic of an internal combustion engine system operable with the air control apparatus of FIGS. 1-4.

FIG. 5 illustrates a system 400 that may be provided on a vehicle, generator, or load powered by an engine 402, where the engine 402 can be either a CI or SI, operable with the control system and controller 300 discussed with reference to FIGS. 1-4. The engine 402 includes an intake system 404 through which charge air enters and an exhaust system 406 through which exhaust gas resulting from combustion exits, it being understood that not all details of these systems that are typically present are shown. The engine 402 includes a number of cylinders 408 forming combustion chambers into which fuel is injected by fuel injectors to combust with the charge air that has entered through intake system 404. The energy released by combustion powers the engine 402 via pistons connected to a crankshaft. Intake valves control the admission of charge air into the cylinders, and exhaust valves control the outflow of exhaust gas through exhaust system 406 and ultimately to the atmosphere. An EGR valve 442 may be provided to control flow from the exhaust system 406 through an EGR conduit 440 to the intake system 404. In certain embodiments, an EGR cooler (not shown) may be provided along the EGR conduit 440 to cool the flow of exhaust gas directed into the intake system 404.

The engine 402 includes an engine block 410 that at least partially defines the cylinders 408. A plurality of pistons (not shown) may be slidably disposed within respective cylinders 408 to reciprocate between a top-dead-center position and a bottom-dead-center position. Each of the cylinders 408, its respective piston, and the cylinder head form a combustion chamber which is further detailed in FIG. 6. In the illustrated embodiment, engine 402 includes six such combustion chambers. However, it is contemplated that engine 402 may include a greater or lesser number of cylinders and combustion chambers and that cylinders and combustion chambers may be disposed in an "in-line" configuration, a "V" configuration, or in any other suitable configuration.

Controller 300 includes a number of inputs for receiving signals from various sensors associated with system 400. In the illustrated embodiment, system 400 includes a mass air flow sensor 420, an ambient air temperature sensor 422, an intake air pressure sensor 424, and an intake manifold pressure (MAP) sensor 426, each in fluid communication with the intake system 404.

Mass air flow sensor 420 provides a measurement of fresh air flow to intake 404. Mass air flow sensor 420 is located upstream of any pressure source, such as a compressor (not shown), that may be disposed in intake system 404. In certain embodiments, it is contemplated that the mass air flow sensor 420 can be a vane type air flow meter, a hot wire air flow meter, or any other mass air flow sensor 420 through which a mass air flow can be determined. Mass air flow sensor 420 is connected to controller 300 and operable to produce a fresh air flow rate signal indicative of the fresh air flow rate. Furthermore, it is contemplated that the fresh air flow rate can be determined virtually, such as, for example, by calculating the air flow rate from other operating parameters.

In one embodiment, the intake manifold pressure sensor 426, operative to sense the amount of air pressure in the intake manifold, and mass air flow sensor 420 can be utilized to calculate an EGR mass fraction which is an indication of the amount of EGR flow being supplied to intake manifold 404. However, any suitable method for determining an EGR mass flow is contemplated.

System 400 further includes an oxygen sensor 430 in fluid communication with the exhaust system 406 to provide a measurement of the level or amount of oxygen in the exhaust gas from engine 402. Oxygen sensor 430 may be a true oxygen sensor, or any type of sensor from which the oxygen level in the exhaust gas can be determined. Oxygen sensor 430 is connected to controller 300 and operable to produce an oxygen level signal indicative of the oxygen level in the exhaust gas.

Figure 6:
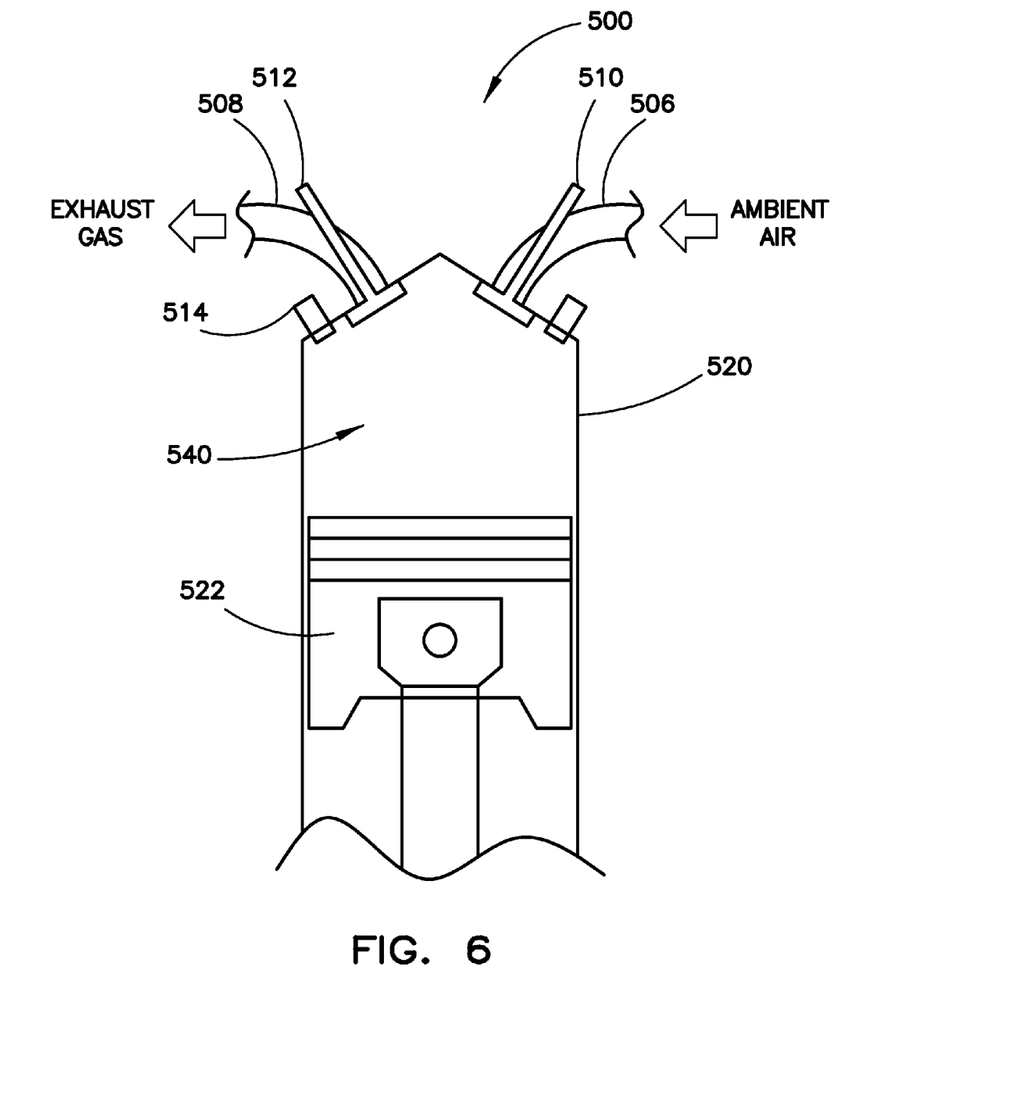
FIG. 6 is a schematic cross-section of an exemplary engine cylinder.

FIG. 6 provides an illustrative embodiment of an exemplary engine cylinder 500, and in particular, a pressure sensor 514 coupled with an air cylinder 520 in fluid communication with an air compression chamber 540. Pressure sensor 514 can be used to determine the IMEP discussed above. The engine cylinder 500 includes a piston 522 to transfer the force to a crankshaft (not shown). The engine cylinder 500 further includes an air intake passage 506 and an exhaust passage 508 in fluid communication with the compression chamber 540. An air intake valve 510 is configured to control the flow of ambient air into the combustion chamber 540. An exhaust valve 512 is configured to control the flow of exhaust from the combustion chamber 540.

As is evident from the figures and text presented above, a variety of embodiments according to the present disclosure are contemplated. For example, one aspect involves a method that includes determining a target fuel amount required to satisfy a net torque demand in an engine in response to a torque request and an engine speed, and determining a base air mass flow value to the engine in response to the target fuel amount. The base air mass flow value is based on, for example, at least one of a stoichiometric AFR and target ignition timing. Various adjustments that can be made to the base air mass flow value include at least one of: a first air mass flow adjustment from a lambda efficiency table as a function of a deviation of a current AFR from the stoichiometric air-to-fuel ratio and of an oxygen amount in an exhaust gas and the air mass flow value; a second air mass flow adjustment from an ignition timing efficiency table as a function of an engine speed and an ignition timing deviation and the air mass flow value; and a third air mass flow adjustment from an exhaust gas recirculation (EGR) and variable valve actuation (VVA) efficiency table as a function of a VVA cam phase and an EGR mass flow. The method includes determining an air mass flow command for operation of the engine from the adjusted base air mass flow value and a feedback control adjustment of the adjusted base mass air flow value based on a deviation of an actual torque output from a target torque output.

In one embodiment, determining the air mass flow command further comprises determining a target air mass flow value in response to the feedback control adjustment of the adjusted base air mass flow value, and correcting the target air mass flow value for at least one of an EGR mass flow and a VVA disturbance rejection. In another embodiment, determining the air mass flow command further includes correcting the target air mass flow by a correction factor determined in response to an intake manifold pressure, an ambient temperature, and the VVA cam phase. In another refinement, the ignition timing deviation is the difference between a current ignition timing and an target ignition timing determined in an optimal or desired operating condition.

In another aspect, a method includes determining an air mass flow command for an engine in response to a target air mass flow value determination. The target air mass flow value is a function of a base air mass flow value that is adjusted for at least one of a lambda efficiency, an ignition timing efficiency, and an exhaust gas recirculation (EGR) and variable valve actuation (VVA) efficiency. The adjusted base air mass flow value may be further corrected in response to an EGR flow amount and a VVA disturbance rejection to determine the target air mass flow value. The base air mass flow value is determined as a function of a target fuel amount that is based on an engine speed and a target torque and an air-to-fuel ratio. The method includes providing a charge air flow to the engine in response to the air mass flow command.

In one embodiment of the method, the lambda efficiency is selected from a lambda lookup table in response to an oxygen level in an exhaust gas. In another embodiment, the ignition timing efficiency is selected from an ignition timing lookup table in response to the engine speed and an ignition timing deviation. In still another embodiment, the EGR and VVA efficiency is selected from an EGR and VVA lookup table in response to a VVA cam phase and an EGR mass flow.

Another aspect of the disclosure, a method includes determining an air mass flow command for an engine in response to a target air mass flow value is a function of a base air mass flow value that is adjusted for at least one of a lambda efficiency, an ignition timing efficiency, and an exhaust gas recirculation (EGR) correction. The adjusted base air mass flow value is further adjusted in response to a variable valve actuation (VVA) disturbance rejection to determine the target air mass flow value. The base air mass flow value is determined as a function of a target fuel amount that is based on an engine speed, a target torque, and an air-to-fuel ratio.

In one embodiment of the method, the EGR correction is a function of the EGR mass flow and a conversion coefficient. In yet another embodiment of the method, the VVA disturbance rejection is a function of an intake manifold pressure, an ambient temperature, and a VVA cam phase.

In yet another aspect, a method includes determining a base air mass flow value to at least one cylinder of an internal combustion engine as a function of a target fuel amount and an air-to-fuel ratio; determining at least one of a lambda efficiency value, an ignition timing efficiency value, an exhaust gas recirculation (EGR) and variable valve actuation (VVA) efficiency value; adjusting the base air mass flow value in response to the at least one of the lambda efficiency value, the ignition timing efficiency value, and the EGR/VVA efficiency value; determining an EGR mass flow correction and a VVA disturbance rejection correction; correcting the adjusted base air mass flow value in response to the EGR mass correction and the VVA disturbance correction; and providing a charge air flow to the internal combustion engine corresponding to the corrected and adjusted base air mass flow value.

In one embodiment of the method, adjusting the base air mass flow value comprises at least one operation selected from the operations consisting of multiplying the air mass flow value and the lambda efficiency value; multiplying the air mass flow value and the igniting timing efficiency value; and multiplying the air mass flow value and the EGR/VVA efficiency value. In another embodiment, the method includes determining a deviation of a measured torque of the internal combustion engine from a target torque and providing a feedback control adjustment of the adjusted base air mass flow value in response to the deviation.

In another aspect of the disclosure, a method includes determining a base air mass flow value to at least one cylinder of an internal combustion engine as a function of a target to a fuel amount and an air-to-fuel ratio. The lambda efficiency value is based on an ignition timing efficiency value, an exhaust gas recirculation (EGR) mass flow correction, and a variable valve actuation (VVA) disturbance rejection correction. Various adjustments that can be made to the base air mass flow values in response to at least one of the lambda efficiency values include: the ignition timing efficiency values, the EGR mass flow correction the VVA disturbance rejection correction, and proving a charge air flow to the internal combustion engine corresponding to the adjusted base air mass flow value.

In one embodiment, adjusting the base air mass flow value comprises at least one operation selected from operation consisting of: multiplying the air mass flow value and the lambda efficiency value; multiplying the air mass flow value and the igniting timing efficiency value; adding the air mass flow value to the EGR mass flow correction, wherein the correction is a function of the EGR mass flow and a conversion coefficient; and multiplying the air mass flow value and the VVA disturbance rejection correction, wherein the VVA disturbance rejection correction is a function of an intake manifold pressure, and ambient temperature, and a VVA cam phase.

Another embodiment of the method includes determining a deviation of a measured torque of the internal combustion engine from a target torque, and providing feedback control adjustment of the adjusted base air mass flow value in response to the deviation.

According to another aspect, a system includes an engine having an air control system configured to provide an air mass flow to the engine in response to an air mass flow command, a sensor in an exhaust system connected to the engine for determining an oxygen level in exhaust gases emitted from the engine, a sensor in an exhaust system connected to the engine for determining a mass air flow of exhaust gas recirculating to the engine, and a controller connected to the air handling system, the engine, the oxygen level sensor, and the mass air flow sensor. The controller is configured to determine the air mass flow command in response to a target air mass flow value, the target air mass flow value being a function of a base air mass flow value adjusted for a lambda efficiency, an ignition timing efficiency, and an exhaust gas recirculation (EGR) and variable valve actuation (VVA) efficiency. The base air mass flow value is determined as a function of a target fuel amount in response to an engine speed and a target torque and an air-to-fuel ratio at optimal or target conditions, such as at a target or desired spark timing or stoichiometric air-to-fuel ratio.

In one embodiment, the controller is further configured to correct the adjusted base air mass flow value in response to an EGR correction. The EGR correction is a function of the EGR mass flow and a predetermined conversion coefficient. In a refinement of the embodiment, the controller is further configured to correct the adjusted base air mass flow in response to a VVA disturbance rejection. The VVA disturbance rejection is a function of an intake manifold pressure, an ambient temperature, and the VVA cam phase.

In another embodiment, the controller is configured to determine a deviation of a measure torque of the internal combustion engine from the target torque. In response to the deviation, a determination of the target air mass flow value is made by a feedback control adjustment of the adjusted base air mass flow value. The internal combustion engine includes at least one cylinder defining a pressure chamber and further comprising at least one pressure sensor connected to at least one cylinder operable to measure pressure in the pressure chamber. The measured torque is then determined from the pressure.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining a target fuel amount required to satisfy a net torque demand in an engine in response to a target torque and an engine speed of an engine;
   determining a base air mass flow value to the engine in response to the target fuel amount, wherein the base air mass flow value is based on at least one of a stoichiometric air-to-fuel ratio and target ignition timing;
   determining an adjusted base air mass flow value that is adjusted in response to:
   a first air mass flow adjustment that is determined from an ignition timing efficiency table as a function of an engine speed and an ignition timing deviation, wherein the ignition timing deviation is the difference between a current ignition timing and a target ignition timing determined for a desired operating condition; and determining an air mass flow command for operation of the engine from the adjusted base air mass flow value and a feedback control adjustment based on a deviation of an actual torque output from a target torque output.

2. The method of claim 1, the method further comprising:
a second air mass flow adjustment determined from an exhaust gas recirculation (EGR) and variable valve actuation (VVA) efficiency table as a function of a VVA cam phase and an EGR mass flow.

3. The method of claim 1, the method further comprising:
a second air mass flow adjustment determined from an exhaust gas recirculation mass flow modified by a conversion coefficient; and
a third air mass flow adjustment determined from a variable valve actuation (VVA) disturbance rejection.

4. The method of claim 3, wherein the VVA disturbance rejection is a function of an intake manifold pressure, an ambient temperature, and the VVA cam phase.

5. The method of claim 1, the method further comprising:
a second air mass flow adjustment determined from a lambda efficiency table as a function of a deviation of a current air-to-fuel ratio from the stoichiometric air-to-fuel ratio and of an oxygen amount in an exhaust gas.

6. A method, comprising:
determining an air mass flow command for an engine in response to a target air mass flow value determination, wherein the target air mass flow value is a function of a base air mass flow value that is adjusted for at least one of a lambda efficiency, an ignition timing efficiency, and an exhaust gas recirculation (EGR) and variable valve actuation (VVA) efficiency, wherein the base air mass flow value is determined as a function of an a target fuel amount that is based on an engine speed and a target torque and an air-to-fuel ratio; and
providing a charge air flow to the engine in response to the air mass flow command.

7. The method of claim 6, wherein the lambda efficiency is selected from a lambda lookup table in response to an oxygen level in an exhaust gas.

8. The method of claim 6, wherein the ignition timing efficiency is selected from an ignition timing lookup table in response to the engine speed and an ignition timing deviation.

9. The method of claim 6, wherein the EGR and VVA efficiency is selected from an EGR and VVA lookup table in response to a VVA cam phase and an EGR mass flow.

10. A method, comprising:
determining an air mass flow command for an engine in response to a target air mass flow value determination, wherein the target air mass flow value is a function of a base air mass flow value that is adjusted for at least one of a lambda efficiency, an ignition timing efficiency, and an exhaust gas recirculation (EGR) correction, and the adjusted base air mass flow value is further adjusted in response to a variable valve actuation (VVA) disturbance rejection to determine the target air mass flow value, wherein the base air mass flow value is determined as a function of an a target fuel amount that is based on an engine speed and a target torque and an air-to-fuel ratio; and
providing a charge air flow to the engine in response to the air mass flow command.

11. The method of claim 10, wherein the EGR correction is a function of the EGR mass flow and a conversion coefficient.

12. The method of claim 10, wherein the VVA disturbance rejection is a function of an intake manifold pressure, an ambient temperature, and a VVA cam phase.

13. A method, comprising:
determining a base air mass flow value to at least one cylinder of an internal combustion engine as a function of a target fuel amount and an air-to-fuel ratio;
determining at least one of a lambda efficiency value, an ignition timing efficiency value, an exhaust gas recirculation (EGR) and variable valve actuation (VVA) efficiency value;
adjusting the base air mass flow value in response to the at least one of the lambda efficiency value, the ignition timing efficiency value, and the EGR and VVA efficiency value; and
providing a charge air flow to the internal combustion engine corresponding to the adjusted base air mass flow value.

14. The method of claim 13, wherein the adjusting of the base air mass flow value comprises at least one operation selected from the operations consisting of:
multiplying the air mass flow value and the lambda efficiency value;
multiplying the air mass flow value and the igniting timing efficiency value; and
multiplying the air mass flow value and the EGR and VVA efficiency value.

15. The method of claim 13, further comprising:
determining a deviation of a measured torque of the internal combustion engine from a target torque; and
providing a feedback control adjustment of the adjusted base air mass flow value in response to the deviation.

16. A method, comprising:
determining a base air mass flow value to at least one cylinder of an internal combustion engine as a function of a target fuel amount and an air-to-fuel ratio;
determining at least one of a lambda efficiency value, an ignition timing efficiency value, an exhaust gas recirculation (EGR) mass flow correction, and a variable valve actuation (VVA) disturbance rejection correction;
adjusting the base air mass flow value in response to the at least one of the lambda efficiency value, the ignition timing efficiency value, the EGR mass flow correction, and the VVA disturbance rejection correction; and
providing a charge air flow to the internal combustion engine corresponding to the adjusted base air mass flow value.

17. The method of claim 16, wherein the adjusting the base air mass flow value comprises at least one operation selected from the operations consisting of:
multiplying the air mass flow value and the lambda efficiency value;
multiplying the air mass flow value and the igniting timing efficiency value;
adding the air mass flow value to the EGR mass flow correction, wherein the EGR correction is a function of the EGR mass flow and a conversion coefficient; and
multiplying the air mass flow value and the VVA disturbance rejection correction, wherein the VVA disturbance rejection correction is a function of an intake manifold pressure, an ambient temperature, and a VVA cam phase.

18. The method of claim 16, further comprising:
determining a deviation of a measured torque of the internal combustion engine from a target torque; and
providing a feedback control adjustment of the adjusted base air mass flow value in response to the deviation.

19. A system, comprising:
an engine having an air handling system configured to provide an air mass flow to the engine in response to an air mass flow command;
at least one sensor for determining an oxygen level in exhaust gases emitted from the engine;
at least one sensor for determining a mass air flow of exhaust gas recirculating to the engine; and
a controller connected to the air handling system, the engine, and the sensors, wherein the controller is configured to determine the air mass flow command in response to a target air mass flow value, the target air mass flow value being a function of a base air mass flow value that is adjusted for at least one of a lambda efficiency, an ignition timing efficiency, and an exhaust gas recirculation (EGR) and variable valve actuation (VVA) efficiency, wherein the base air mass flow value is determined at stoichiometric conditions as a function of a target fuel amount and an air-to-fuel ratio, wherein further the target fuel amount is based on an engine speed and a target torque.

20. The system of claim 19, wherein the controller is further configured to correct the target air mass flow in response to an EGR correction, wherein the EGR correction is a function of the EGR mass flow and a predetermined conversion coefficient.

21. The system of claim 20, wherein the controller is further configured to correct the target air mass flow in response to a VVA disturbance rejection, wherein the VVA disturbance rejection is a function of an intake manifold pressure, an ambient temperature, and the VVA cam phase.

22. The system of claim 19, wherein the controller is configured to determine a deviation of a measured torque of the internal combustion engine from the target torque and, in response to the deviation, determine the target air mass flow value by a feedback control adjustment of the adjusted base air mass flow value.

23. The system of claim 22, wherein the engine includes at least one cylinder defining a pressure chamber and further comprising at least one pressure sensor connected to the at least one cylinder operable to measure a pressure in the pressure chamber, and the measured torque is determined from the pressure.

* * * * *